(No Model.) 2 Sheets—Sheet 2.

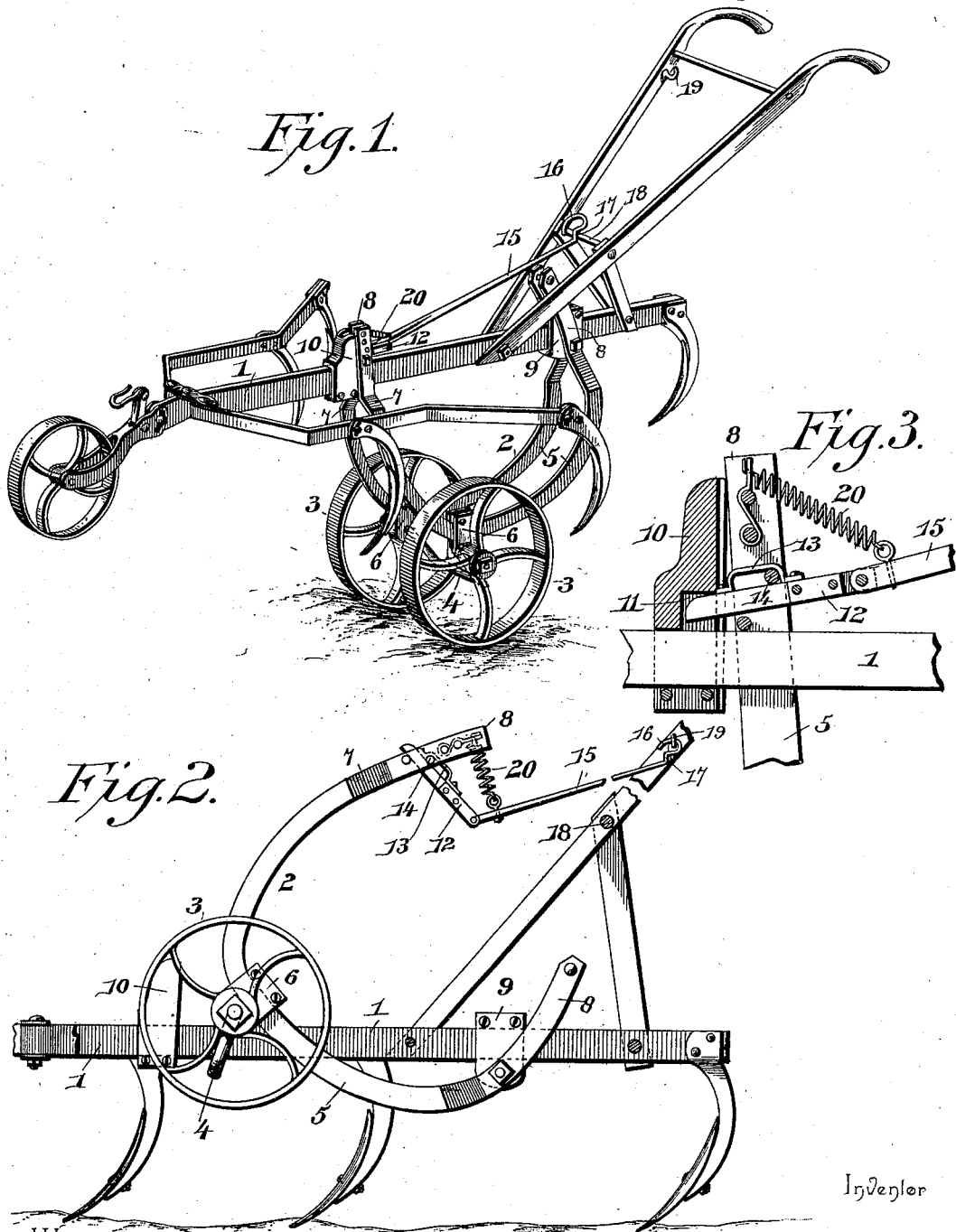

O. PHINNEY.
CULTIVATOR TRUCK.

No. 589,193. Patented Aug. 31, 1897.

Witnesses
Jas. K. McCathran
V. B. Hillyard

Inventor
Oliver Phinney
By his Attorneys,
C. A. Snow & Co.

UNITED STATES PATENT OFFICE.

OLIVER PHINNEY, OF CAIRO, NEW YORK.

CULTIVATOR-TRUCK.

SPECIFICATION forming part of Letters Patent No. 589,193, dated August 31, 1897.

Application filed November 30, 1896. Serial No. 613,983. (No model.)

*To all whom it may concern:*

Be it known that I, OLIVER PHINNEY, a citizen of the United States, residing at South Cairo, in the county of Greene and State of New York, have invented a new and useful Cultivator-Truck, of which the following is a specification.

This invention relates to means for transporting a cultivator or agricultural implement of similar construction from one place to another without requiring the loading of the same upon a farm or other wagon.

The improvement is in the nature of a truck applied to the frame of the implement in such a manner as either to form a part thereof or to be detached after the machine has reached its destination, and this truck is so constructed that it can be lowered into engagement with the ground for supporting the implement or elevated when the implement is in condition for cultivating or tilling the soil as it is drawn over the field.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 4:
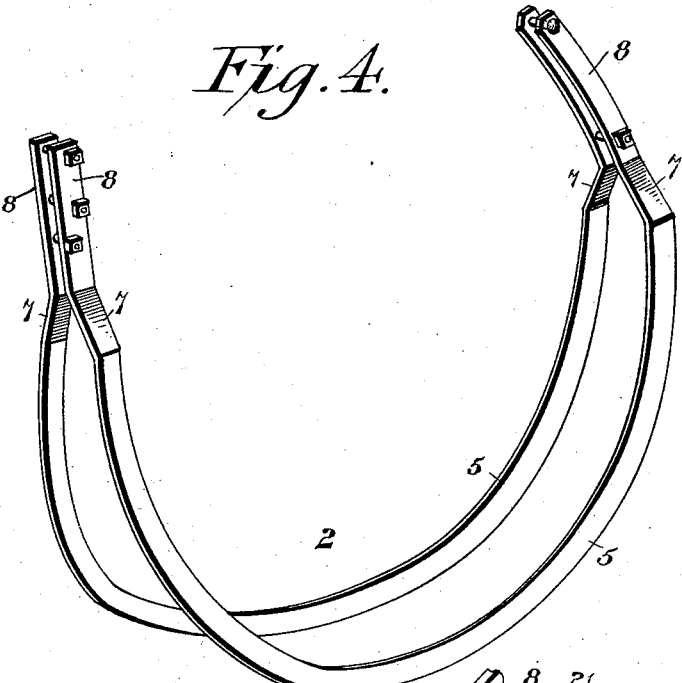
Figure 5:
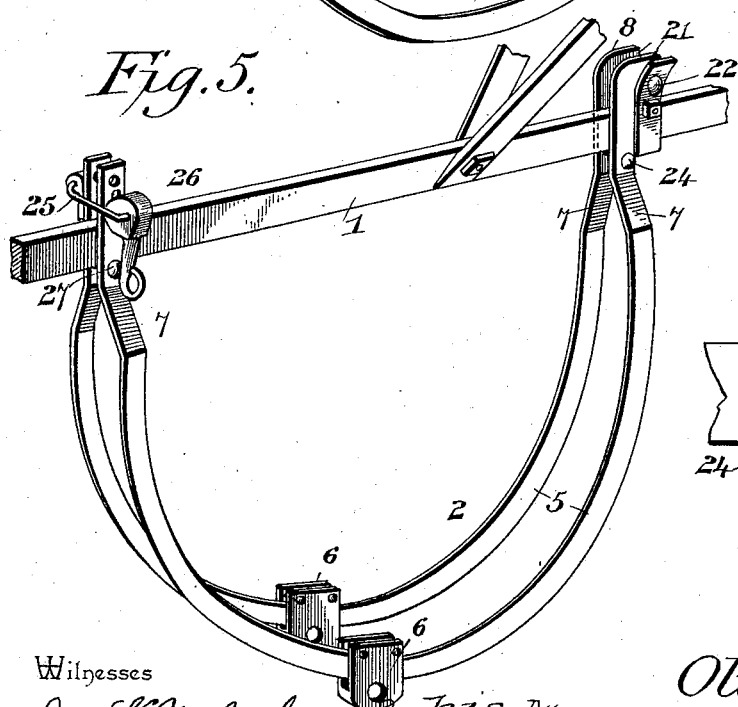
Figure 6:
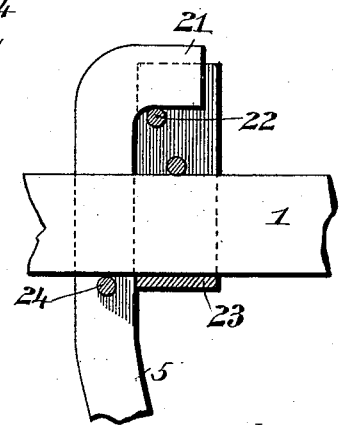

Figure 1 is a perspective view showing the invention applied to a cultivator of ordinary construction, the truck being lowered and supporting the implement out of engagement with the ground. Fig. 2 is a side elevation thereof, parts being broken away, showing the truck elevated and the implement as it will appear when in position for cultivating. Fig. 3 is a detail view of the instrumentalities for securing the truck when adjusted to an operative position. Fig. 4 is a detail view of the truck-frame. Fig. 5 is a detail view showing different means for connecting the truck-frame to the cultivator or implement and which will admit of the truck being readily detached when the implement has arrived at the place of use. Fig. 6 is a detail view showing the means for connecting one end of the truck-frame with a beam of the implement.

Corresponding and like parts are referred to in the following description and indicated in the several views of the accompanying drawings by the same reference-characters.

The implement shown is typical of the class for which the invention is designed and is a cultivator of ordinary construction and is illustrated to show the application of the invention, the latter being attached to the middle beam or frame-bar 1, so as to distribute the load evenly upon the truck, thereby facilitating the transporting of the implement without requiring a truck of broad gage.

The truck comprises a frame 2 and supporting-wheels 3, the latter being mounted upon the spindles formed at the ends of a crank-axle 4, which connects the lower portions of the frame-bars 5 and is supported in blocks 6, bolted or otherwise secured to the lower or middle portion of the said frame-bars 5. The frame-bars 5 of the truck are provided in pairs and are of similar and corresponding construction and approximate a U form in side elevation, the side members curving outwardly, thence inwardly, instead of being straight and extending parallel. The end portions of the frame-bars 5 are bent inward, as shown at 7, and are again bent, forming parallel portions 8, which extend upon opposite sides of the beam 1 and embrace the same when the truck is in service, as clearly shown in Figs. 1 and 5. Clips 9 and 10 are bolted or otherwise secured to the beam 1, and the rear ends of the frame-bars 5 have pivotal connection with the clip 9, whereas their front ends are secured together and have detachable connection with the clip 10, whereby upon releasing the front end of the truck the latter will tilt upon its pivotal connection with the clip 9 and permit the implement to settle upon the ground and the truck to be elevated out of the way, as clearly indicated in Fig. 2. The rear side of the clip 10 is formed with a recess 11, which receives a latch 12, by means of which the front end of the truck-frame is locked to the clip 10 when the truck is supporting the implement for transporting or for any other required purpose. A keeper 13 is secured to the latch 12 and forms a guide for a bolt, pin, or other fastening 14, by means of which the front end of the frame-bars 5 are connected, and this keeper 13, in conjunction with the fastening 14, guides the latch 12 in its movements and likewise limits its throw. An operating-rod 15 has pivotal connection with the rear end of the latch 12 and is formed at its rear end with a handle 16, having an offset 17 to engage with a cross-bar 18 of the handle, so as to prevent the accidental withdrawal of the latch 12 from engagement with the clip 10, and this handle 16 is adapted to be passed over a stop 19, applied to the inner side of a cultivator-handle for holding the truck elevated, as clearly shown in Fig. 2. A spring 20, of suitable construction, is interposed between the front end of the truck-frame and the operating-rod 15 to normally hold the latch 12 projected and in engagement with the clip 10.

The truck can be applied to any style of implement and, as shown in Fig. 1, will support the same free of the ground and admit of it being readily transported by applying the draft thereto in the same manner as practiced when the implement is in service for cultivating or tilling the soil. When the implement has reached its destination, the operating-rod 15 is disengaged from the cross-rod 18 and is pulled upon with sufficient force to disengage the latch 12 from the clip 10, when the implement will settle upon the ground, and a continued pull upon the operating-rod will tilt the truck upon its pivotal connection with the clip 9 and throw it about into the position shown in Fig. 2, when by engaging the handle 16 with the stop 19 the said truck will be held up out of the way, thereby permitting the implement to be used in the accustomed manner without interference by the presence of the truck. The handle 16 and stop 19 form means for holding the attachment elevated, and may be of any form so long as they will interlock.

It is sometimes desirable to construct the truck so that it may be readily disconnected from or applied to the implement with which it is to be used, and in this form the rear ends of the frame-bars 5 are bent, as shown at 21, to extend over a bolt or fastening 22, employed for connecting a clip 23 with the beam 1, and a bolt 24 connects the rear ends of the bars 5 at a point immediately below the beam 1 and supports the latter. The front ends of the bars 5 are connected by suitable means, preferably a clamp consisting of a swinging link 25 and a cam-dog 26, mounted upon the free end of the link, so as to cause the front ends of the frame-bars to bind against the sides of the beam 1 when the truck is in position. A bolt 27 connects the front ends of the bars 5 and comes beneath the beam 1 and supports the latter when the truck is in position. This truck is only applied to the implement when the latter is in transit and is removed when the machine has reached the desired point.

Having thus described the invention, what is claimed as new is—

1. In combination, an agricultural implement, similarly-formed bars 2 and 5 deflected or curved between their ends, means for adjustably and pivotally connecting one end of the deflected bars to the longitudinal middle frame-bar of the implement, a locking means applied to and carried by the opposite end of the deflected bars for securing them to the said middle frame-bar in a working position, and an axle journaled to the deflected bars at an intermediate point and provided with ground-wheels, substantially as set forth.

2. A truck for transporting agricultural implements, consisting of similar frame-bars curved longitudinally and having their end portions bent toward each other, thence about parallel to receive between them a beam of the implement, means for pivotally and adjustably securing the ends of the truck together and to a beam or frame-bar of the implement, an axle connecting the lower portion of the frame-bars, and ground-wheels mounted upon the ends of the axle, substantially as set forth.

3. A truck for transporting agricultural implements, composed of similar frame-bars of approximately U form having their end portions bent toward each other, thence to extend parallel and come upon opposite sides of a bar or beam of the implement, means for pivotally and adjustably securing the said beam or bar between the end portions of the frame-bars, an axle connecting the lower portion of the frame-bars and having a crank portion between its ends to afford clearance for the beam, and ground-wheels mounted upon the ends of the crank-axle, substantially as set forth.

4. The combination with an agricultural implement, of a truck having pivotal connection with a bar or beam thereof at one end, a latch at the opposite end of the truck to engage with a portion of the implement to hold the truck in position for supporting the implement, and an operating-rod having connection with the latch to release the latter, and provided with a stop to engage with a portion of the implement to hold the truck elevated when not required for active service, substantially as set forth.

5. The combination with an agricultural implement, of a truck having pivotal connection therewith at one end, a latch having sliding connection with the opposite end of the truck and adapted to engage with a portion of the implement for holding the truck in working relation, an operating-rod having pivotal connection with the said latch and provided with a stop or projection to engage with a portion of the implement for holding the truck up out of the way, and a spring for normally holding the latch projected and in engagement with the part coöperating therewith, substantially as and for the purpose set forth.

6. The combination with an agricultural implement, of clips secured thereto, a truck having pivotal connection with one of the clips at one end, a latch having slidable connection with the opposite end of the truck and adapted to engage with the other clip to hold the truck in a working position, an operating-rod having pivotal connection with the latch and provided with a stop to engage with a portion of the implement to hold the truck up out of the way, and a spring for holding the latch in engagement with the clip with which it coöperates, substantially as and for the purpose set forth.

In testimony that I claim the foregoing as my own I have hereto affixed my signature in the presence of two witnesses.

OLIVER PHINNEY.

Witnesses:
CHARLES E. BASSETT,
WILLIAM PALMATIER.